United States Patent [19]

Swihart et al.

[11] Patent Number: 4,677,147
[45] Date of Patent: Jun. 30, 1987

[54] BAKEWARE RELEASE COATING

[75] Inventors: Terence J. Swihart, Essexville; Dennis W. Broderick, Rhodes, both of Mich.

[73] Assignee: Dow Corning Corporation, Midland, Mich.

[21] Appl. No.: 843,476

[22] Filed: Mar. 24, 1986

[51] Int. Cl.$^4$ ............................ C08K 5/54; C08K 5/09
[52] U.S. Cl. ...................................... 524/268; 524/394; 524/398; 524/399; 524/400; 524/730; 524/731
[58] Field of Search ......................... 524/268, 730, 731

[56] References Cited

U.S. PATENT DOCUMENTS

| 2,462,242 | 2/1949 | Webb et al. | 220/64 |
| 2,606,510 | 8/1952 | Collings | 107/54 |
| 2,672,104 | 3/1954 | Clark | 107/54 |
| 3,002,946 | 10/1961 | Thomas | 260/29.1 |
| 3,925,276 | 12/1975 | Merrill | 260/18 |
| 4,302,512 | 11/1981 | Weitemeyer et al. | 428/447 |
| 4,585,705 | 4/1986 | Broderick et al. | 524/268 |

Primary Examiner—Lewis T. Jacobs
Attorney, Agent, or Firm—Christopher E. Blank

[57] ABSTRACT

A release coating used in cooking and baking comprising a thermosettable polyorganosiloxane resin, a non-curable polydiorganosiloxane fluid, and a combination of at least two metal containing compounds. Optionally, the coatings may contain carboxylic acid.

16 Claims, No Drawings

BAKEWARE RELEASE COATING

BACKGROUND OF THE INVENTION

The present invention relates to release coatings used in cooking and baking foods. The coatings encompassed by the invention comprise a thermosettable polyorganosiloxane resin, a noncurable polydiorganosiloxane fluid, and a combination of at least two compounds which contain different metals. Optionally, the coatings may also include a carboxylic acid.

Siloxane resins and fluid coatings have been known and used as release coatings for a number of years. U.S. Pat. No. 2,606,510 sets forth the use of resins, and U.S. Pat. No. 2,462,242 sets forth the use of fluids. U.S. Pat. No. 2,672,104 teaches hydroxylated polymethylphenylsiloxane resin can be used as a bakeware release coating.

Siloxane resins and fluids have been used in combination as release coatings for a number of years. Such combinations are especially useful because of their ability to release a wide range of foods, and their durability. U.S. Pat. No. 3,002,946 teaches a bakeware release coating comprising 80–98 weight percent thermosettable resin, 1–10 weight percent hydroxyl-endblocked polymethylphenylsiloxane fluid, and 1–19 weight percent nonthermosettable methyl-endblocked polydiorganosiloxane fluid.

A number of improvement patents on the release coating taught in U.S. Pat. No. 3,002,946 have issued. These improvements have been either improved resins, as disclosed in U.S. Pat. No. 3,925,276, or improved fluids, as disclosed in U.S. Pat. No. 4,302,512.

It is an object of this invention to provide a bakeware release coating more durable than previous bakeware release coatings in regards to its release characteristics. It is a further object to provide a coating which is easy to remove, nontoxic and easy to apply to coated and uncoated surfaces.

SUMMARY OF THE INVENTION

The release coatings of the invention comprise a thermosettable polyorganosiloxane resin, a nonthermosettable polydiorganosiloxane fluid, and at least two compounds of different metals. The thermosettable resin contains between 1.0 and 1.7 hydrocarbon radicals per silicon atom, where said hydrocarbon radicals are methyl, ethyl, or phenyl radicals. The nonthermosettable (nonheat curable) polydiorganosiloxane fluid has a degree of polymerization of between about 20 and about 3000, and are hydroxyl, methyl, or phenyl endblocked, and is present in at least 1 to 10 parts per 100 parts of thermosettable resin.

The combination of compounds used in the invention are typically carboxylic acid salts, or coordination compounds, of alkoxy compounds or organic acids, with at least two metals chosen from the group consisting of aluminum, barium, bismuth, cadmium, cerium, chromium, cobalt, copper, gold, iron, lead, lanthanum, manganese, molybdenum, nickel, silver, thallium, thorium, tin, tungsten, uranium, vanadium, and zirconium.

The combination of compounds when present in concentrations of at least about 1 part per million parts of the resin and fluid mixture unexpectedly increases and prolongs the release characteristics of coatings formed by the resin and fluid mixture.

Preferably, the combination of compounds comprises a compound of iron and a compound of cerium, or the combination of a compound of iron, a compound of nickel, and a compound of cerium. For example, a preferred combination is iron octoate and cerium napthenate. Another preferred combination is iron acetylacetonate, nickel acetylacetonate, and cerium acetylacetonate.

DETAILED DESCRIPTION OF THE INVENTION

This invention relates to a release coating comprising a thermosettable polyorganosiloxane resin, a nonthermosettable polydiorganosiloxane fluid, and a combination of at least two compounds each of which contain a metal atom. Each of these compounds contains a different metal chosen from the group consisting of aluminum, barium, bismuth, cadmium, cerium, chromium, cobalt, copper, gold, iron, lanthanum, lead, manganese, molybdenum, nickel, silver, thallium, thorium, tin, tungsten, uranium, vanadium, and zirconium.

The thermosettable resins of the invention can be functionally described as those organosilicon materials which cure upon heating to form a durable resinous material, and which are stable at the temperatures employed in baking food, typically greater than about 300° F. Chemically, these resins include the product of hydrolyzing silanes of the general formula

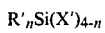

where R' denotes a methyl, ethyl, or phenyl radical, X' represents an alkoxy radical with one to six carbon atoms, an acyloxy radical with two to six carbon atoms, an alkoxyalkoxy radical with between two and six carbon atoms, or a chloro radical, n is 0, 1, 2, or 3 and is between 1.0 and 1.7 on the average. A mixture of silanes is employed, i.e., n can be 0, 1, 2, or 3.

A particularly useful thermosettable resin which can be employed in the present invention is the reaction product of three silanes represented by the general formula

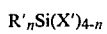

as generally defined above, wherein for 40 to 70 mole percent of the combined silanes R' denotes methyl and n is 1; for 25 to 40 mole percent R' denotes phenyl and n is 1; and for 5 to 10 mole percent R' denotes phenyl and n is 2. Alternately, the thermosettable resins can be made by reacting polydiorganosiloxane of the general formula

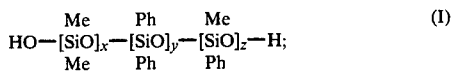

with a silane crosslinker of the general formula

where Me denotes a methyl radical, Ph denotes a phenyl radical, A represents an ethyl, methyl, or phenyl radical, X represents a hydrolyzable radical such as a methoxy, ethoxy, propoxy or other alkoxy radical with between 1 and 6 carbon atoms, or an alkoxyalkoxy radical with between 2 and 10 carbon atoms, an acyloxy radical with 2 to 5 carbon atoms, or a chloro radical. The resin thus formed should have a phenyl to alkyl ratio of at least about 0.20, and preferably between 0.3 and 3. The resin should also have a degree of substitution (the ratio of alkyl and phenyl radicals to silicon atoms) of between 1.0 and 1.7. Particular crosslinkers include methyl trimethoxysilane, trimethoxyphenylsilane, trichloromethylsilane, tris-(methoxyethoxy)-phenylsilane, and ethyltrimethoxysilane.

Thermosettable polyorganosiloxane resins made by alternate methods to those described may be used in the invention if the degree of substitution is between 1.0 and 1.7, and the phenyl to alkyl radical ratio is at least about 0.2. Preferably, the thermosettable resin's degree of substitution is between 1.1 and 1.4, and its phenyl to alkyl mole ratio is between 0.3 and 1.3.

Optionally, the thermosettable polyorganosiloxane resin may also include a condensation catalyst which decrease the heat and time required to cure the resin. The condensation catalysts include a number of organometallic compounds or coordination compounds of metals such as titanium, tin, zinc, and iron. Specific condensation catalysts include stannous octoate, iron octoate, tetrabutyltitinate, zinc octoate, and zinc napthenate.

The nonthermosettable polydiorganosiloxane fluids of the invention are described by the general formula

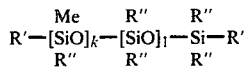

where R' independently denotes hydroxyl, methyl, or phenyl radicals, Me denotes a methyl radical, R" independently denotes methyl, ethyl or phenyl radicals, k is 0 or greater, and the sum of k and 1 is between about 20 and about 3000. The nonthermosettable polydiorganosiloxane fluid must also be incompatible with the thermosetting resin of the invention. Incompatible in this case should be understood to mean that when the resin and fluid are mixed together, in cases where the resin is pourable, the two will separate upon standing after a period of time, preferably several days or less.

The degree of polymerization of the fluids can vary widely within the limits already mentioned. Polydimethylsiloxane fluids with degrees of polymerization between 200 and 800 are preferred with degrees of polymerization of about 500 being the most preferred.

It is preferable to use room temperature pourable fluids to ease the application of the uncured coating to the metal substrate, but it is not required. When more viscous fluids are used, the mixture of resin, fluid and metal compounds can be diluted with a volatile solvent to ease the application of the release coating to the substrate. The nonthermosettable fluids must be of a sufficient degree of polymerization as to not volatilize while the mixture is being heated to cure the thermosetting polyorganosiloxane resin. Generally, a fluid with a vapor pressure less than 20 mm Hg at 300° C. meets this requirement.

The phenyl to alkyl radical ratio of the nonthermosettable fluid can vary, although it is preferred to use fluids which do not contain phenyl radicals, even though phenyl containing fluids are more temperature stable than the pure dimethyl fluids. The nonthermosettable polydiorganosiloxane fluids can be either methyl end-blocked, phenyl end-blocked, or hydroxyl end-blocked. However, the hydroxyl end-blocked fluids generally must have greater degrees of polymerization than the alkyl, or phenyl end-blocked fluids in order to achieve the same release characteristics. Mixtures of polydimethylsiloxane fluids and polymethylphenylsiloxane fluids can be used in the release coating.

The release coatings contain a combination of at least two metal containing compounds. Each of these compounds must contain a metal different from the other compound, and the metal must be a member of the group of metals consisting of aluminum, barium, bismuth, cadmium, cerium, chromium, cobalt, copper, gold, iron, lanthanum, lead, manganese, molybdenum, nickel, silver, thallium, thorium, tin, tungsten, uranium, vanadium, and zirconium. For instance, a combination of cerium and iron containing compounds is a preferred combination. The combination of iron, cerium, and nickel containing compounds is another preferred combination. Both combinations will produce coatings with improved release characteristics. Preferably, one of the metal containing compounds contains cerium. Preferably, the metal containing compounds of the invention are metallic salts of carboxylic acids, or coordination compounds of alkoxy radicals. Particular compounds which can be used in the invention include, but are not limited to, iron octoate, cerium napthenate, cerium octoate, iron acetylacetonate, cerium acetylacetonate, nickel octoate, nickel acetylacetonate, zirconium octoate, and copper acetylacetonate. Where the release coatings are used to release baked food products the metal containing compounds should be chosen so as to minimize potential toxicity problems.

Optionally, the release coating can also contain a small amount of a carboxylic acid having 2 to 12 carbon atoms. These particular carboxylic acids include acetic acid, propanoic acid, butanoic acid, pentanoic acid, hexanoic acid, heptanoic acid, 2-ethylhexanoic acid, and the like.

The proportion of the thermosettable resin, nonthermosettable fluid, and metal compound combination can vary. The thermosettable resin comprises between 80 and 99.5 weight percent; the nonthermosettable fluid should comprise between 0.5 and 20 weight percent; and the metal containing compounds should comprise between 0.0001 and 1.0 weight percent of the total weight of the coating (the total weight of the metal containing compounds should be between 1 and 10,000 parts per million of the combined weight of the thermosettable resin and the nonthermosettable fluid). The metal containing compounds in combination should be present between 1 and 10,000 parts per million of the nonthermosettable fluid. Preferably, the combination of metal containing compounds comprises between 10 and 100 parts per million of the cured release coating. When three organometallic compounds are used in combination it is preferred that each be present in about equal molar portions between 0.004 to 0.10 parts by weight per 100 parts by weight of the nonthermosettable fluid. The carboxylic acid can be present in amounts up to 30 weight percent of the nonthermosettable fluid, or from 0 to 5 percent of the coating composition. When cerium naphthenate and iron octoate are used in combination in the present application the mixture should be present in between 100 and 10,000 parts per million of the nonthermosettable fluid. Another particularly useful combination of metal containing compounds is iron acetylacetonate, nickel acetylacetonate and cerium acetylacetonate in between 0.004 and 0.10 weight percent levels of each metal compound per 100 weight parts of the nonthermosettable fluid. This combination of three metal compounds is particularly useful when the nonthermosettable fluid further comprises up to 30 weight percent of a carboxylic acid.

Optionally, the composition can include a volatile nonreactive organic solvent to aid the application of the composition to substrates. These solvents should be chosen so both the thermosettable resin and nonthermosettable fluid are soluble in the solvent. Such solvents include toluene, xylene, perchloroethylene, methylene chloride, and petroleum ethers. Since the solvent will be volatilized while the coating is cured to the substrate, the solvent can be used in any proportion necessary to ease application.

The compositions are made by mixing the components in any order as long as the combination of metal containing compounds can be dispersed, at least in part, in the nonthermosettable fluid. Since a relatively small amount of the metal containing compounds are employed in the composition, it is advantageous to disperse the metal containing compounds in a volume of the nonthermosettable fluid to form a release additive, and then add the release additive to the thermosettable polyorganosiloxane resin portion of the composition. For instance, 0.1 grams of a mixture of cerium napthenate and iron octoate could be added to 100 grams of polydimethylsiloxane fluid with a degree of polymerization of about 500, and 1.0 gram of this mixture could be added to 100 parts of thermosettable resin to form a release composition.

The release coatings are formed by applying a mixture of the resin, the fluid and the metal containing compounds to a metal substrate, and curing the coating. The coating can be applied by any conventional means such as brushing, dipping, spraying, or the like. The coatings are cured by heating the coating and substrate. Typically, the coatings cure at 300° C. within 5–10 minutes.

The coatings can be applied to bare metal surfaces and to surfaces that have been previously coated. Any article made of such materials can be coated to provide a nonstick surface. When articles are recoated the old coating should be removed in order to provide a new coating with optimal release characteristics. Removal of the old coating is easily accomplished by immersing the article in a caustic soda solution, or the like.

The coatings may also include other nonessential components such as pigments to improve the appearance of the otherwise clear coatings.

The improved release characteristics of the invention coatings are believed to be attributable to the improved ability of these coating to supply the nonthermosettable polydiorganosiloxane release fluid to the surface of the coating. The prior art coatings do not supply all of the release fluid to the surface of the coating before their release characteristics degrade.

EXAMPLES

The following examples illustrate the invention by contrasting specific embodiments of the invention with prior art high temperature release coatings. The specific embodiments given herein do not delineate the full scope of the invention.

EXAMPLE 1

This example illustrates the effect of including the metal containing compounds in the thermosettable resin and nonthermosettable fluid combination. The thermosettable resin had a degree of substitution of about 1.4 and a phenyl to methyl ratio of about 0.3. The nonthermosettable fluid was a dihydroxyl-endblocked polydimethylsiloxane with a degree of polymerization of about 500. 100 g of the nonthermosettable fluid was mixed with 100 g of xylene. 0.8 g of this mixture was mixed with 60.6 g of the thermosettable resin, 39.4 g of volatile nonreactive organic solvent, and 0.1 gram of the condensation catalyst tetrabutyltitinate to form the state of the art release coating, A. Composition B was made in the same way as A, except that 1.0 gram of an iron octoate solution containing 6 weight percent iron, and 2.5 g of a cerium napthenate solution containing 6 percent cerium was added to 200 g of the mixture of nonthermosettable fluid and xylene used in A. Composition C was made by adding 1.6 g of the iron octoate, cerium napthenate, nonthermosettable fluid, and xylene mixture of B to the resin, volatile nonreactive solvent, and condensation catalyst mixture of A. Thus, composition A has 0 parts per million of the metal containing compounds in the cured coating. Composition B has about 10 parts per million of the metal containing compounds by weight of the metals. Composition C has about 20 parts per million of iron and cerium.

Tin plated steel panels were spray coated with one of the compositions, A, B, or C, and the coating was then cured for 6 minutes at 600° F. to make treated panels A', B', and C', respectively. A piece of chicken was then placed on each of the treated panels. The chicken was baked for one-half hour at 525° F. The chicken released from all three panels, however, grease spatters stained panel A', but not panels B', and C'.

EXAMPLE 2

Three panels were made as in example 1. The durability of the release coatings was measured by determining how long each panel would release a cheesecloth wrapped weight after heat cycling. A cheesecloth wrapped weight was placed on each panel, the panel was heated from room temperature to 525° F. and cooled during each cycle. Failure to release was defined as the incident when the weight would not slip off the panel when the panel was inclined 25° from the horizontal. Panel A', the panel without the metal containing compounds, failed after 14 cycles. Panel B' failed at 50 cycles, and panel C' did not fail at 50 cycles. The coatings of panels B' and C' still had a supply of release fluid (the nonthermosetting polydiorganosiloxane) at the surface after the supply of the release fluid in panel A's coating was exhausted. This demonstrates that the metal containing compounds increase the durability of the coatings release characteristics.

What is claimed is:
1. A release coating comprised of;
    (a) thermosettable polyorganosiloxane resin;
    (b) nonthermosettable polydiorganosiloxane fluid;
    (c) a combination of at least two metal containing compounds, where each compound contains a different metal chosen from the group consisting of aluminum, barium, bismuth, cadmium, cerium, chromium, cobalt, copper, gold, iron, lead, lanthanum, manganese, molybdenum, nickel, silver, thallium, thorium, tin, tungsten, uranium, vanadium, and zirconium, where said metal containing compounds are incorporated substantially in the nonthermosettable polydiorganosiloxane fluid portion of the composition, in which (a) comprises between 80 and 99.5 weight percent of said release coating composition, (b) comprises between 0.5 and 20 weight percent of said release coating composition and is incompatible with (a), and (c) comprises between 1 and 10,000 parts per million by weight of (a) and (b).

2. The release coating of claim 1 wherein the thermosettable polyorganosiloxane resin has between 1.0 and 1.7 hydrocarbon radicals per silicon atom where said radicals are chosen from the group consisting of methyl, ethyl, and phenyl, and (c) is present in at least 10 parts per million weight parts of the nonthermosettable fluid (b).

3. The release coating of claim 1 wherein the thermosettable polyorganosiloxane resin comprises the reaction product of; a polymer represented by the general formula $$\text{HO}-[\text{SiO}]_x-[\text{SiO}]_y-[\text{SiO}]_z-\text{H}; \quad \begin{matrix} \text{Me} & \text{Ph} & \text{Me} \\ & & \\ \text{Me} & \text{Ph} & \text{Ph} \end{matrix} \quad (I)$$

a crosslinker of the general formula $$\text{A-Si X}_3; \quad (II)$$

and, a condensation catalyst; where Me denotes a methyl radical, Ph denotes a phenyl radical, x, y, and z are chosen so that the ratio of phenyl to methyl radicals is at least 0.20, A denotes a methyl or ethyl radical, or a phenyl radical, X is an alkoxy radical with 1 to 6 carbon atoms, or an acyloxy radical with 2 to 5 carbon atoms, and (II) is present in sufficient quantity with respect to (I) that the ratio of the sum of the alkyl and phenyl radicals to silicon atoms is between 1.0 and 1.7.

4. The release coating of claim 2 wherein the thermosettable polyorganosiloxane resin comprises the product of reacting silanes of the general formula $$R'_n\text{Si}(X')_{4-n}$$

where R' denotes a methyl, ethyl, or phenyl radical, X' represents an alkoxy radical with 1 to 6 carbon atoms, an acyloxy radical with between 2 and 6 carbon atoms, an alkoxyalkoxy radical with between 2 and 6 carbon atoms, or a chloro radical, n is 0, 1, 2, or 3 and is between 1.0 and 1.7 on the average.

5. The release coating of claim 4 where 40 to 70 mole percent of the silanes used in the reaction process are described by the formula where R' denotes methyl, and n is 1; 25 to 40 mole percent are described by the formula where R' denotes phenyl and n denotes 1; and 5 to 10 mole percent are described by the formula where R' denotes phenyl and n is 2.

6. The release coating of claim 1 which also comprises a carboxylic acid with 2 to 12 carbon atoms, and said acid is present in an amount up to 5 weight percent of (a) and (b) combined.

7. The release coating of claim 1 wherein the nonthermosettable polydiorganosiloxane fluid is described by the general formula $$R'-[\text{SiO}]_k-[\text{SiO}]_l-\text{Si}-R' \quad \begin{matrix} \text{Me} & R'' & R'' \\ & & \\ R'' & R'' & R'' \end{matrix}$$

where R' independently denotes hydroxyl, methyl, or phenyl radicals, Me denotes a methyl radical, R'' independently denotes methyl, ethyl or phenyl radicals, k is 0 or greater, and the sum of k and l is between about 20 and about 3000.

8. The release coating of claim 7 where R' predominantly denotes hydroxyl radicals, R'' denotes methyl radicals, and the sum of k and l is between about 200 and 800.

9. The release coating as claimed in claim 7 wherein the combination of metal containing compounds (c) is cerium napthenate and iron octoate and said combination is present between 100 and 10,000 parts per million of (b).

10. The release coating of claim 9 wherein the weight ratio of cerium napthenate to iron octoate is between 2 and 3.

11. The release coating of claim 7 where the combination of metal containing compounds is (i) iron acetylacetonate, (ii) nickel acetylacetonate and (iii) cerium acetylacetonate, wherein (i) is present in 0.004 to 0.10 parts per 100 parts of said nonthermosettable polydiorganosiloxane fluid (b), (ii) is present in 0.004 to 0.10 parts by weight per 100 parts of (b), (iii) is present in 0.004 to 0.10 parts by weight of (b), and where said release coating also includes from 0 to 30 parts by weight of a carboxylic acid per 100 parts of (b).

12. The product of heating the composition of claim 1.

13. The product of heating the composition of claim 6.

14. The product of heating the composition of claim 9.

15. The product of heating the composition of claim 11.

16. A method for making a release coating which comprises mixing a combination which comprises at least two metal containing compounds, where each metal containing compound contains a different metal chosen from the group consisting of aluminum, barium, bismuth, cadmium, cerium, chromium, cobalt, copper, gold, iron, lanthanum, lead, manganese, molybdenum, nickel, silver, thallium, thorium, tin, tungsten, uranium, vanadium, and zirconium with a nonthermosettable polydiorganosiloxane fluid to form a release additive;

mixing said release additive with a thermosettable polyorganosiloxane resin;

coating a substrate with the mixture of release additive and thermosettable polyorganosiloxane resin; and, curing said coating.

* * * * *